UNITED STATES PATENT OFFICE.

JOSEPH ROSENHEK, OF MAINKUR, NEAR FRANKFORT-ON-THE-MAIN, ASSIGNOR TO LEOPOLD CASSELLA & CO., OF FRANKFORT-ON-THE-MAIN, GERMANY.

PRODUCTION OF YELLOW COLORING-MATTERS.

SPECIFICATION forming part of Letters Patent No. 412,979, dated October 15, 1889.

Application filed April 12, 1889. Serial No. 306,999. (Specimens.) Patented in France October 16, 1888, No. 193,582.

*To all whom it may concern:*

Be it known that I, JOSEPH ROSENHEK, doctor of philosophy, a citizen of the Empire of Germany, and a resident of Mainkur, near Frankfort-on-the-Main, Germany, have invented new and useful Improvements in the Production of new Yellow Dye-Stuffs, (for which I have obtained French Patent No. 193,582, dated October 16, 1888,) of which the following is a specification.

It is known that paratoluidine heated with sulphur is transformed into bases which contain sulphur, (Dahl & Co.'s German patent, No. 35,790.) The nature of the product formed is altered by the proportional quantity of sulphur employed, (Dahl & Co.'s German patent application, D 3,362.) While the so-called "thioparatoluidine" of Dahl & Co. is soluble in spirit and may be obtained by crystallization, the product becomes insoluble in spirit when the quantity of sulphur is increased. Almost the same reactions take place when, instead of paratoluidine, xylidine is used. The thionated bases therefrom have first been mentioned in Leopold Cassella & Co.'s German patent application dated October 3, 1888.

The nature of my invention consists in having ascertained and discovered the following facts:

First. The thionated primary bases from paratoluidine and xylidine can be easily transformed into tertiary bases by alkylating or benzylating the same.

Second. The products resulting from this process yield to water the salts of tertiary bases which dye mordanted cotton a bright-yellow shade; (Thioflavine T.)

Third. The remainder, which is insoluble in water, can be converted into sulpho-acids in the usual manner. The alkaline salts of the sulpho-acids are soluble in water, and dye unmordanted cotton in an alkaline bath a bright-yellow shade, which I name "Thioflavine S."

Fourth. The sulpho-acids of the basic dye-stuffs mentioned above under No. 2 are likewise valuable dye-stuffs. They dye unmordanted cotton in alkaline bath a greenish-yellow shade, (Thioflavine S.)

In order to produce my alkylated bases, I can use all the methods which are generally known in chemistry as fit for this purpose—as, for instance, treating with halogenes of alkyles, with or without pressure, or with an acid and an alcohol, or with an alcohol alone. It is the same with the process of sulphonation, whereby I may work with sulphuric acid containing more or less anhydrous acid or with other sulphonating agents having a similar effect.

In the following I describe how my invention may be put into practice.

Example: Twenty-five kilos of alkylated base, crude or purified, forming soluble or insoluble salts, I dissolve in seventy kilos of monohydrated sulphuric acid. I then add ten to twelve kilos of fuming acid containing about sixty per cent. of anhydrous sulphuric acid. At a temperature of 70° to 80° centigrade the sulphonation is terminated. The smelt is poured into cold water, whereby the sulpho-acid is precipitated. The same is then separated by filtration, dissolved in an alkali, and again precipitated by addition of common salt. I then obtain, after desiccation, my new dye-stuff, which dyes cotton in alkaline bath a bright yellow.

The new coloring-matter is easily soluble in water, difficultly soluble in alcohol, with a yellow color showing an intensive green fluorescence. Diluted acids precipitate the free acid from the aqueous solution of the color. Nitrous acid does not react upon the dye-stuff.

What I claim as new, and desire to secure by Letters Patent, is—

As a new article of manufacture, the yellow coloring-matter obtained by sulphonating the alkylated thio bases from paratoluidine and xylidine, dyeing cotton a bright yellow in alkaline bath, being in the form of an alkaline salt easily soluble in water, scarcely soluble in alcohol, with green fluorescence.

In testimony that I claim the foregoing as my invention I have signed my name, in presence of two witnesses, this 22d day of March, 1889.

JOSEPH ROSENHEK.

Witnesses:
ALVESTO P. HOGUE,
JEAN GRUND.